(12) United States Patent
Jones et al.

(10) Patent No.: US 7,258,075 B1
(45) Date of Patent: Aug. 21, 2007

(54) COLLAPSIBLE BIRD FEEDER

(75) Inventors: Chad H. Jones, Frisco, TX (US); Gustav P. Kuelbs, Grapevine, TX (US)

(73) Assignee: World Factory, Inc., Coppell, TX (US)

( * ) Notice: Subject to any disclaimer, the term of this patent is extended or adjusted under 35 U.S.C. 154(b) by 17 days.

(21) Appl. No.: 11/200,916

(22) Filed: Aug. 10, 2005

Related U.S. Application Data

(60) Provisional application No. 60/601,484, filed on Aug. 13, 2004.

(51) Int. Cl.
*A01K 61/02* (2006.01)

(52) U.S. Cl. .................................................. 119/57.9

(58) Field of Classification Search ........ 119/428–430, 119/459, 461, 464, 474, 475, 498
See application file for complete search history.

(56) References Cited

U.S. PATENT DOCUMENTS

| | | | |
|---|---|---|---|
| 1,108,566 A | 8/1914 | Foster | |
| 1,132,973 A | 3/1915 | Rappleye | |
| 1,790,045 A * | 1/1931 | William | 119/52.1 |
| 3,961,444 A * | 6/1976 | Skaife | 47/79 |
| 4,188,913 A | 2/1980 | Earl et al. | 119/51 |
| 4,204,500 A * | 5/1980 | Podjan | 119/57.8 |
| 4,747,370 A * | 5/1988 | Olson | 119/52.2 |
| 4,940,019 A * | 7/1990 | Coffer | 119/52.2 |
| 5,111,772 A | 5/1992 | Lipton | 119/579 |
| 5,123,380 A | 6/1992 | Edwards | 119/57 |
| 5,375,558 A * | 12/1994 | Drakos | 119/57.9 |
| 5,975,015 A * | 11/1999 | Runyon et al. | 119/52.1 |
| 6,360,690 B1 * | 3/2002 | Canby | 119/52.2 |
| 6,427,629 B1 * | 8/2002 | Lush | 119/52.1 |
| 6,647,921 B2 | 11/2003 | Stokes et al. | 119/52 |
| 6,684,811 B2 | 2/2004 | Rich et al. | 119/52 |
| 7,032,538 B1 * | 4/2006 | Lush | 119/52.1 |
| 2003/0150391 A1 | 8/2003 | Rich | 119/57 |

* cited by examiner

*Primary Examiner*—Thomas Price
(74) *Attorney, Agent, or Firm*—James E. Walton

(57) ABSTRACT

A collapsible bird feeder having a tubular lower chamber with feed ports near the bottom of the lower chamber and side walls extending from the top of the lower chamber to the bottom of the lower chamber is disclosed. A lip extends inwardly from the side walls near the top of the lower chamber. A tubular upper chamber has feed ports near the lower end of the upper chamber and side walls extending from the top of the upper chamber to the bottom of the upper chamber. A lip extends outwardly from the side walls of the upper chamber near the bottom of the upper chamber. A fill tube extends from the top of the upper chamber through the bottom of the upper chamber to allow material to pass from near the top of the upper chamber into the lower chamber. The lower chamber has an inner perimeter and the upper chamber has an outer perimeter. The outer perimeter is of similar cross sectional shape and slightly smaller than the inner perimeter to allow the upper chamber so that the upper chamber may slide within the lower chamber.

17 Claims, 3 Drawing Sheets

COLLAPSIBLE BIRD FEEDER

This application claims the benefit of U.S. Provisional Application No. 60/601,484, filed 13 Aug. 2004, titled "Collapsible Bird Feeder."

BACKGROUND OF THE INVENTION

1. Field of the Invention

The invention relates to bird feeders, and more particularly to collapsible bird feeders.

2. Description of the Prior Art

Bird feeders are well known for attracting and sustaining wild birds. Bird feeders typically are containers filled with feed, the containers having outlets where feed may be removed by birds. Many bird feeders are placed near homes to attract birds. Other animals, such as squirrels, are attracted to the feeders and attempt to take the feed. Therefore bird feeders are often placed in areas that are difficult to access in hopes of preventing access by other animals. Also, perch cages are sometimes used to limit access by larger animals.

A common problem with bird feeders is that the user will typically want a large feeder to prevent frequent filling of the feeder while the retailer will want a smaller feeder to reduce storage and shipping costs. Also, some users will want a smaller feeder for storage, but a larger feeder for usage.

To remedy this situation some have developed collapsible bird feeders. An example looks similar to a collapsible drinking cup, with multiple concentric sections that form a large chamber when expanded. This sort of feeder provides for good feeder capacity and good storage, but only provides one feeder level and one storage chamber. The single feeder level limits the number of birds that can feed at a given time. Also, it is difficult to fashion a perch cage around such a feeder, making it easier for larger animals to eat the feed.

Another idea has been to use a similar collapsible cup design, but with two feeder levels. This allows for greater access by more birds. Two problems remain with this design. Again, it is difficult to fashion a perch cage to fit the feeder. Also, the upper level will not have access to feed once some of the feed has been removed by the birds, making the upper level less useful.

SUMMARY OF THE INVENTION

There is a need for a multi-level, collapsible bird feeder which provides for feeding over a longer period of time. It would be a further advantage if the collapsible bird feeder allowed for easy attachment of a perch cage without hampering the collapsing function of the feeder.

It is an object of this invention to provide a collapsible bird feeder with multiple feed storage chambers to allow continuous feeding from multiple levels. It is a further object of this invention to provide a perch cage that provides protection of the feeder from larger animals and collapses with the feeder.

These and other objects are achieved by providing a bird feeder with a lower chamber and an upper chamber such that the upper chamber may rest within the lower chamber in a collapsed formation or be over the lower chamber in an extended formation. The upper chamber has a fill tube to allow for separate filling and storage in the upper and lower chambers.

An embodiment of a collapsible bird feeder provides a perch cage comprised of an upper perch cage and a lower perch cage each attached to the upper chamber and lower chamber, respectively. The upper perch cage and the lower perch cage are attached such that they do not interfere with the movement of the chamber from between an extended formation and a collapsed formation.

The present invention provides several significant advantages, including: (1) providing continuous multi-level feeding; (2) providing a collapsible feeder for improved storage and shipping without sacrificing feed capacity; and (3) providing a collapsible perch cage for the collapsible feeder.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
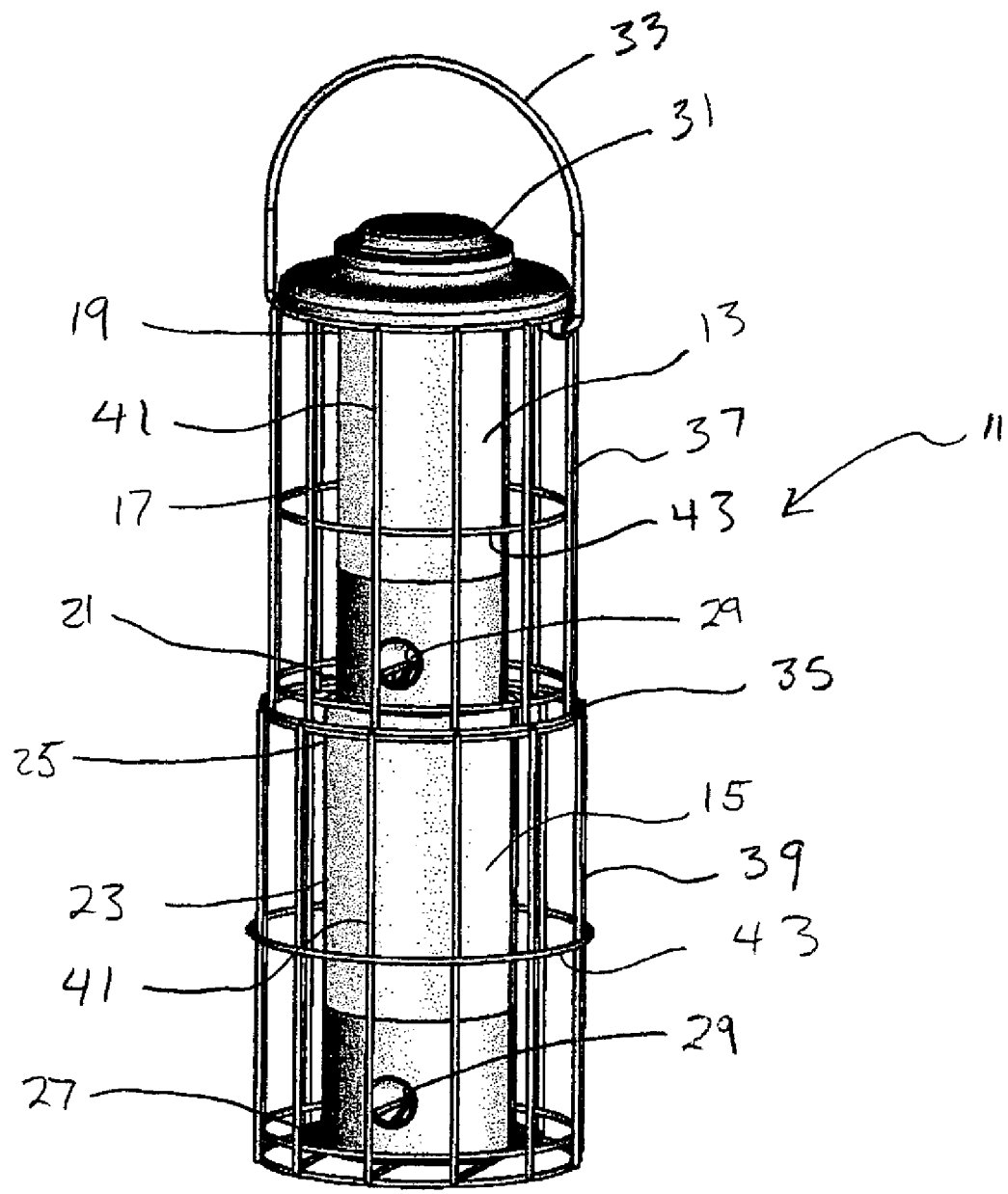
FIG. 1 is a perspective view of a bird feeder in an extended position.

Referring to FIG. 1 of the drawings, a collapsible feeder 11 is shown having an upper chamber 13 and a lower chamber 15. Upper chamber 13 and lower chamber 15 are tubular, and in the embodiment shown have a circular cross section, although the invention is not so limited. Upper chamber 13 has side walls 17, top 19, and a bottom 21. Similarly, lower chamber 15 has side walls 23, top 25, and a bottom 27. Each chamber 13, 15 has feed ports 29 located on side walls 17, 23 near bottoms 21, 27.

A lid 31 is affixed to top 19 of upper chamber 13. Lid 31 may extend beyond side walls 17, as shown in FIG. 1, or may be limited to the cross sectional shape of side walls 17. Having top 19 extend beyond side walls 17 provides better weather protection for ports 29. A handle 33 may be affixed to upper chamber 13 near top 19 or may be affixed to lid 31, as shown in FIG. 1. Handle 33 may be pivotally attached to lid 31.

Continuing with FIG. 1, a perch cage 35 surrounds upper chamber 13 and lower chamber 15. Perch cage 35 has an upper cage 37 and a lower cage 39, each being formed of vertical tines 41 and horizontal rings 43. Tines 41 and rings 43 may be metallic and welded together, or tines 41 and rings 43 may be a thermoplastic material that is heat bonded, or tines 41 and rings 43 may be a natural material, such as wood or bamboo, that is bonded by glue or tying.

Figure 2:
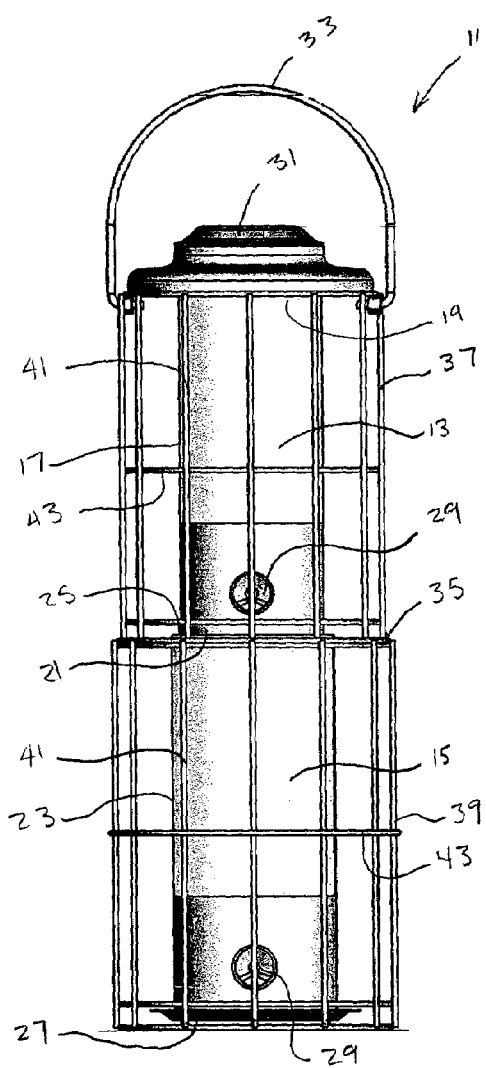
FIG. 2 is a front view of the feeder of FIG. 1 in an extended position.

Referring now to FIG. 2 of the drawings, a larger front view of the feeder 11 of FIG. 1 is shown in an extended position. From this view it easy to see that upper chamber 13 has an outside diameter that is slightly smaller than the outside diameter of lower chamber 15. Also, it is clear that upper cage 37 has an outside diameter that is slightly smaller than the outside diameter of lower cage 39. The relative size of these dimensions is discussed in more detail below in reference to FIGS. 4 and 5. The extended position shown in FIG. 2 allows maximum capacity of feeder 11 to reduce filling intervals and allow for multi-level feeding from ports 29.

Another feature of feeder 11 that is clear form FIG. 2 is that side walls 17, 23 do not need to be of a single material. In the example shown side walls 17, 23 are primarily of a transparent material, except near feed port 29. This allows the owner to easily observe the feed level of the feeder while also providing a more durable material near feed ports 29. Also, by not having a transparent material near feed ports 29 the birds are less likely to experience confusion as to where feed may be obtained form the feeder. Feed ports 29 extend through side walls 17, 23 to allow easy access by birds to the feed within upper chamber 13 and lower chamber 15.

Figure 3:
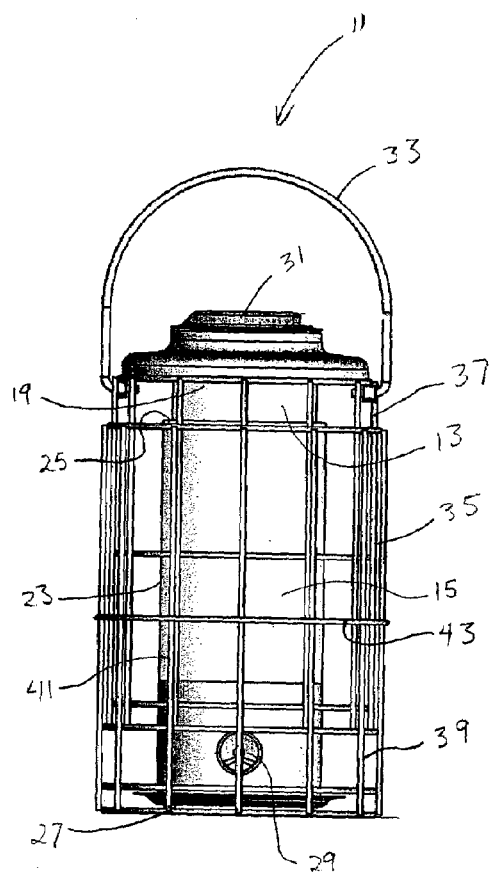
FIG. 3 is a front view of the feeder of FIG. 1 in a collapsed position.

Referring now to FIG. 3 of the drawings, feeder 11 of FIG. 2 is shown in a collapsed position. As compared to FIG. 2, a significant portion of upper chamber 13 is within lower chamber 15 and a significant portion of upper cage 37 is within lower cage 39. This collapsed position is advantageous for storage and shipping of feeder 11.

Figure 4:
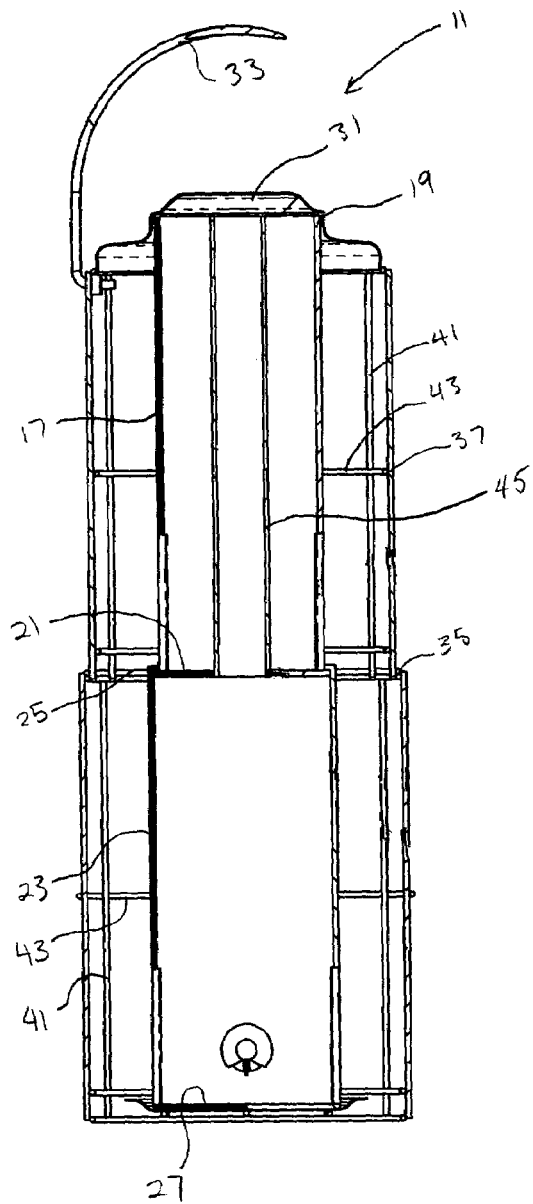
FIG. 4 is a sectional view of the feeder of FIG. 1 in an extended position.

Referring now to FIG. 4 of the drawings, a sectional view of feeder 11 of FIG. 1 is shown. This sectional view reveals fill tube 45 extending from near top 19 of upper chamber 13 through bottom 21 of upper chamber 13. Fill tube 45 allows for the filling of lower chamber 15 independent of upper chamber 13. Fill tube 45 allows upper chamber 13 to have a different feed than lower chamber 15. Also, fill tube 45 allows the feed ports 29 of upper chamber 13 to supply feed even when half of the feed capacity has been drained from feeder 11. In other words, if upper chamber 13 did not have bottom 21 and fill tube 45 the feed level would drop below feed ports 29 in upper chamber 13 after some time. This would require constant filling of feeder 11 to maintain multi-level feeding. By providing bottom 21 on upper chamber 13 and fill tube 45 extending through bottom 21, feeder 11 allows multi-level feeding through feed ports 29 even after significant depletion of the feed.

Figure 5:
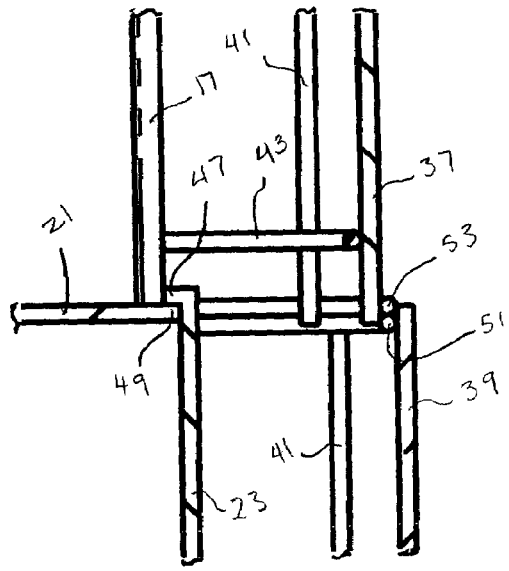
FIG. 5 is an enlarged portion of the sectional view of FIG. 4.

Referring now to FIG. 5 of the drawings, a detail of the sectional view of FIG. 4 shows how feeder 11 achieves both an extended position and a collapsed position. As discussed above, side walls 17, 23 form tubular chambers 13, 15. Side walls 17, 23 may form a circular tubular chamber 13, 15, as shown, or may be of some other tubular shape, such as oval, square, triangular, or some other polygonal or curvilinear tubular cross section. Symmetry of the cross section is not necessary, although both chambers 13, 15 have the same cross sectional shape. Importantly, the cross section of upper chamber 13 is smaller than the cross section of lower chamber 15 so that upper chamber 13 may slide within lower chamber 15. Because a variety of shapes may be used, the relative sizes of upper chamber 13 and lower chamber 15 may be expressed in terms of an outer perimeter of upper chamber 13 being smaller than the inner perimeter of lower chamber 15 to allow upper chamber 13 to slide within lower chamber 15.

As shown clearly in FIG. 5 of the drawings, lower lip 47 extends from top 25 of side walls 23 of lower chamber 15. Upper lip 49 extends outwardly from bottom 21 of upper chamber 13. Lower lip 47 interferes with upper lip 49, such that as upper chamber 13 slides within lower chamber 15, upper chamber 13 may not slide beyond the extended position where upper lip 49 meets lower lip 47.

Similarly, perch cage 35 has an upper cage 37 and a lower cage 39 of similar cross sections with the upper cage 37 being smaller than lower cage 39 so that upper cage 37 may slide within lower cage 39. Upper perch cage 37 is attached near top 19 of upper chamber 13 and lower perch cage 39 is attached near bottom 27 of lower chamber 15. Also, rings 43 on upper cage 37 are preferably attached to the interior of tines 41, and rings 43 of lower cage 39 are preferably attached to the exterior of lower cage 39. This configuration allows for upper cage 37 to slide within lower cage 39 without rings 43 interfering. An upper stop 51 is shaped similar to rings 43 and is attached to the exterior of tines 41 of upper cage 37 near the bottom of upper cage 37. A lower stop 53 is shaped similar to rings 43 and is attached to the interior of tine 41 of lower cage 39 near the top of lower cage 39. Upper stop 51 and lower stop 53 interferes with the free sliding of upper cage 37 within lower cage 39 such that upper cage 37 may not extend beyond the extended position shown.

It is apparent that an invention with significant advantages has been described and illustrated. Although the present invention is shown in a limited number of forms, it is not limited to just these forms, but is amenable to various changes and modifications without departing from the spirit thereof. For example, an alternative embodiment of the invention may not include fill tube 45, but instead may provide fill holes located on an upper portion of each chamber 13, 15.

We claim:

1. A collapsible, multi-chamber bird feeder, comprising:
a first chamber enclosing a first volume, the first chamber having at least one feed port in fluid communication with the first volume;
a second chamber enclosing a second volume, the second chamber having at least one feed port in fluid communication with the second volume, the first chamber being extensibly carried in the second chamber; and
a fill tube located within the first volume, the fill tube extending from an outer portion of the first volume and being in fluid communication with the second volume for allowing material to pass through the fill tube and into the second volume;
wherein the first chamber is movable between a retracted position, in which at least a portion of the first chamber is located within the second chamber, and an extended position, in which the first chamber substantially extends from the second chamber; and
wherein the first and second volumes are separated to prevent fluid communication between the volumes.

2. The feeder according to claim 1, further comprising:
retention means for retaining the first and second chambers together by preventing movement of the first chamber beyond the extended position.

3. The feeder according to claim 2, wherein the retention means comprises a lip on each of the chambers, the lips being configured to engage each other when the first chamber is moved to the extended position.

4. The feeder according to claim 1, wherein the first and second chambers have a circular cross-sectional shape.

5. The feeder according to claim 1, further comprising:
a handle attached to one of the first and second chambers.

6. The feeder according to claim 1, further comprising:
at least one perch cage attached to an exterior of one of the first and second chambers.

7. The feeder according to claim 1, further comprising:
a removable lid configured for covering the outer portion of the first volume.

8. A collapsible, multi-chamber bird feeder, comprising:
a first chamber enclosing a first volume, the first chamber having at least one feed port in fluid communication with the first volume;

a second chamber enclosing a second volume, the second chamber having at least one feed port in fluid communication with the second volume, the first chamber being extensibly carried in the second chamber;

a first perch cage attached to the first chamber and spaced from a perimeter of the first chamber; and a second perch cage attached to the second chamber and spaced from a perimeter of the second chamber;

wherein the first chamber is movable between a retracted position, in which at least a portion of the first chamber is located within the second chamber, and an extended position, in which the first chamber substantially extends from the second chamber; and wherein the first and second volumes are separated to prevent fluid communication between the volumes.

9. A multi-chamber, collapsible feeder, comprising:

a lower chamber having a feed port and a lip at an upper end of the lower chamber;

an upper chamber slidingly engaged with the lower chamber, the upper chamber having a feed port and a lip at the bottom of the upper chamber, the upper chamber also having a fill tube extending through a bottom of the upper chamber for communicating the lower chamber with the interior of the fill tube;

a first perch cage attached to the upper chamber and spaced from a perimeter of the upper chamber; and a second perch cage attached to the lower chamber and spaced from a perimeter of the lower chamber;

wherein the upper and lower chambers are separated to Prevent fluid communication therebetween; and wherein the lips cooperate to prevent the upper chamber from separating from the lower chamber.

10. The feeder according to claim 9, wherein the upper and lower chambers have a circular cross-sectional shape.

11. The feeder according to claim 9, further comprising:
a handle attached to the upper chamber.

12. The feeder according to claim 9, further comprising:
a removable lid configured for covering an end of the upper chamber located opposite the lower chamber.

13. A collapsible bird feeder, comprising:

a tubular lower chamber with feed ports near a bottom of the lower chamber; and a tubular upper chamber with feed ports near a lower end of the upper chamber, the upper chamber being slidingly carried within the lower chamber and movable between a retracted position and an extended position; and a fill tube extending from the top of the upper chamber through the bottom of the upper chamber for allowing material to pass from the top of the upper chamber into the lower chamber;

wherein the lower chamber has an inner perimeter and the upper chamber has an outer perimeter, the outer perimeter being of similar cross-sectional shape and slightly smaller than the inner perimeter to allow the lower chamber to slidingly carry the upper chamber within the lower chamber.

14. The feeder according to claim 13, wherein the upper and lower chambers have a circular cross-sectional shape.

15. The feeder according to claim 13, further comprising:
a handle attached to the upper chamber.

16. The feeder according to claim 13, further comprising:

a first perch cage attached to the upper chamber and spaced from the outer perimeter of the upper chamber; and a second perch cage attached to the lower chamber and spaced from an outer perimeter of the lower chamber.

17. The feeder according to claim 13, further comprising:
a removable lid configured for covering the top of the upper chamber.

* * * * *